July 25, 1972  P. ANDEREGG ET AL  3,679,522

WRAPPING MACHINE

Filed June 22, 1970  2 Sheets-Sheet 1

Inventors
PAUL ANDEREGG
ROLF G. GRANER
By Herbert Stern
Attorney

United States Patent Office 3,679,522
Patented July 25, 1972

3,679,522
WRAPPING MACHINE
Paul Anderegg, Horgen, and Rolf G. Granger, Oberrieden, Switzerland, assignors to International Standard Electric Corporation, New York, N.Y.
Filed June 22, 1970, Ser. No. 48,352
Claims priority, application Switzerland, June 25, 1969, 9,711/69
Int. Cl. B32b 1/08
U.S. Cl. 156—477
6 Claims

ABSTRACT OF THE DISCLOSURE

A machine for wrapping flat-oval bodies with an adhesive tape. The bodies to be wrapped are supplied to a first slotted wheel and adhesive tape is brought into contact with said body and said first wheel, said tape being subsequently cut into strips of desired length by a heated wire. The body is then transferred, by means of a lifting segment, to a second slotted wheel, this operation covering three sides of said bodies with adhesive tape. A second lifting mechanism coupled to said second wheel transfers said body to a third slotted wheel, this latter transfer completing the wrapping of said body. A third lifting segment attached to said third wheel subsequently removes the body from its slot on said third wheel.

BACKGROUND OF THE INVENTION

This invention relates to a machine for wrapping flat-oval bodies with an adhesive tape and more particularly to a machine for enveloping electrical components, e.g., capacitors or dry cells with an insulating adhesive tape.

It is well known in the prior art to envelope an electrical component by applying a heat shrinking sleeve. However, such a method is deficient in that heat may damage components and further that the utilization of heat shrink material is not easily adaptable to mass production.

Prior art systems are also known for wrapping bodies of circular cross section. Such a machine is described in U.S. patent application No. 13,263 by P. Anderegg and R. Graner filed Feb. 20, 1970 and assigned to the assignee of the present invention. However, such a machine is not suitable for use with bodies of a flat-oval cross-section.

SUMMARY OF THE INVENTION

It is therefore an object of the present invention to provide a wrapping machine which does not require the continuous application of high levels of heat to an electrical component.

It is a further object of the invention to provide such a machine which is easily adaptable to mass production.

According to the present invention there is provided a machine for wrapping flat-oval bodies with an adhesive tape including a base, a first wheel coupled to said base having slots formed therein for receiving and retaining said bodies, means for bringing said tape into contact with said bodies retained in said slots, means coupled to said first wheel for severing said tape into desired lengths, a second wheel coupled to said base having slots formed therein for receiving and retaining said bodies, first means coupled to said first wheel for transferring said bodies from said first wheel to said second wheel where said bodies are partially wrapped with said tape, means adapted to receive said bodies from said second wheel and to convey said bodies so that each length of tape is wrapped about each body individually, and second means coupled to said second wheel for transferring said bodies from said second wheel to said receiving means.

Further objects and features of this invention will become more apparent by reference to the following description taken in conjunction with the accompanying drawings, in which:

DESCRIPTION OF THE PREFERRED EMBODIMENT

Figure 1:
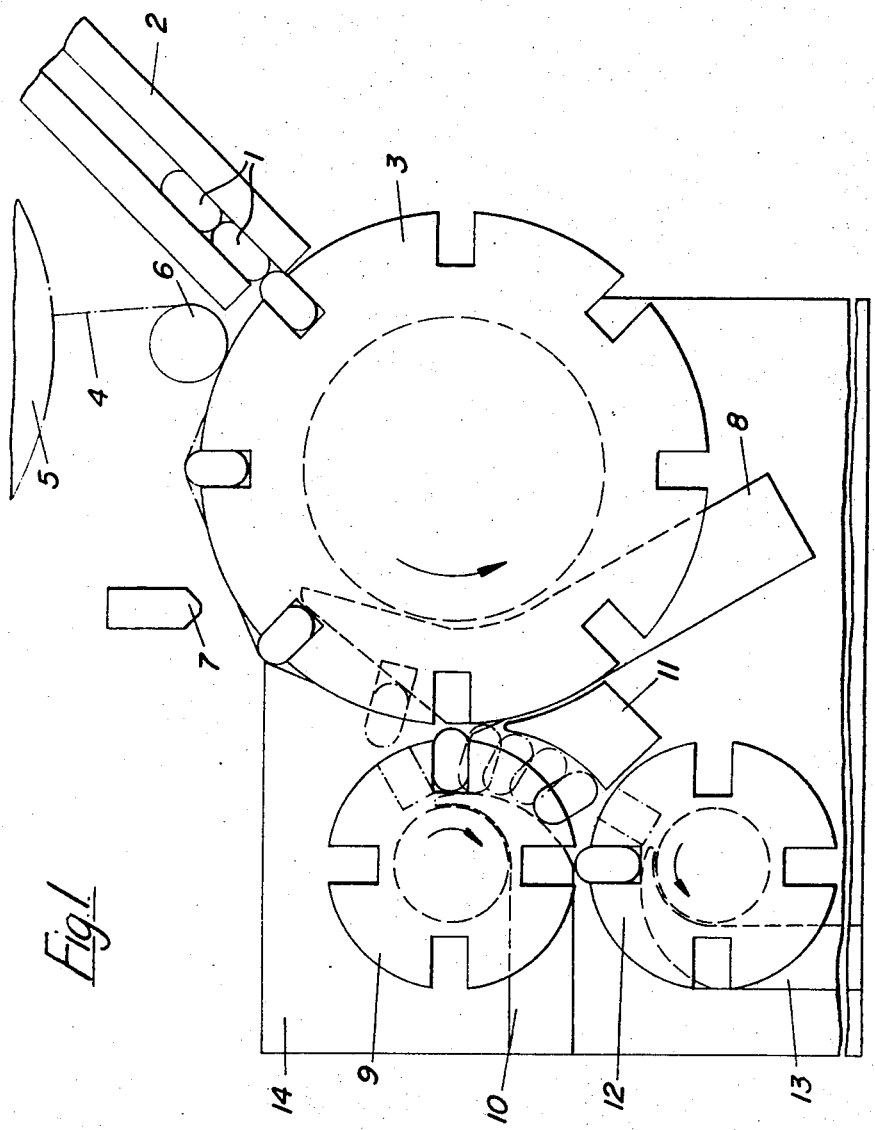
FIG. 1 illustrates a front view of a preferred embodiment of a machine used for wrapping flat-oval bodies with an adhesive tape.

The following description of the wrapping machine is limited to those parts of the machine involved in the wrapping process. Firstly the operation mode of the machine will be described. A flat-oval body 1 to be wrapped is fed to a supply arrangement 2 which supplies said body in the correct position into a slot of a continuously rotating first slotted wheel 3. An adhesive tape 4 runs from a feed roll 5 to the first slotted wheel via a resiliently mounted guiding roll 6 in such a manner that the adhesive side of the tape adheres on the portions of the first slotted wheel between the slots and on a portion of the flat-oval body in the slot. Then the tape still adhering on the first slotted wheel 3 is cut into pieces of suitable length by a cutting device 7. With the aid of a lifting segment 8 the body to be wrapped, with the severed piece of adhesive tape adhering thereto, is lifted out of its slot in the first slotted wheel 3 and inserted into a slot of a second slotted wheel coupled to said first slotted wheel whereby the adhesive tape 4 is, in the course of insertion into the slot of wheel 9, brought into contact with three sides of the body and adheres thereon. A lifting segment 10 forming part of the second slotted wheel 9 lifts the body out of its slot in the second slotted wheel 9 against a guiding segment 11 the cylindrical surface of which adjacent to the body is coaxial with the cylindrical surface of the lifting segment 10 adjacent to the body. The portion of the adhesive tape 4 still adhering on the first slotted wheel 3 is separated therefrom, drawn about the round nose of the guiding segment 11 projecting upwards and applied to the free side of the flat-oval body. Then the body is inserted into a slot of a third slotted wheel 12 by the lifting segment 10 so that the free end of the adhesive tape is permitted to complete the coverage of the last side of the body, with the ends of the tape overlapping. The wrapped body is lifted out of the slot of the third slotted wheel by a lifting segment 13 forming part of the third slotted wheel 12 and conveyed to a storage container (not shown).

Figure 2:
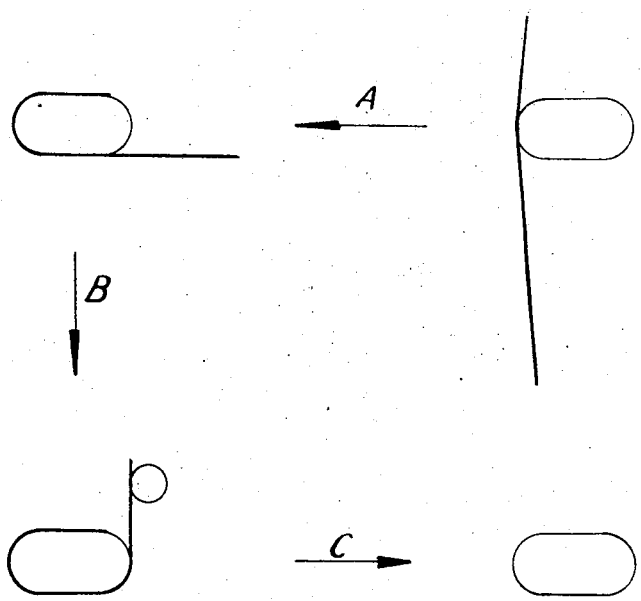
FIG. 2 illustrates a flow diagram of the wrapping process.

The series of individual movements can easily be seen from the flow diagram of FIG. 2. Starting with a flat-oval body including a piece of adhesive tape adhering thereon the adhesive tape is brought into contact with three sides of the body by the movement A, i.e. the insertion of the body into a slot of the second slotted wheel. By the movement B, i.e. the passage of the partially wrapped body along the curved channel formed between guide 11 and wheel 9, guidance of the projecting end of the tape about the nose of the guiding segment is effected, and the end of the tape is thereby applied to a portion of the remaining side of the body. By the movement C, i.e. insertion of the body into a slot of the third slotted wheel, the free end of the tape is permitted to complete the wrapping of the body via contacting the beginning of the tape in an overlapping manner.

Some of the machine parts involved in the wrapping process will now be described in greater detail. The first slotted wheel 3 is pivotably mounted on a base plate 14 and is provided at its circumference with a number of rectangular slots for receiving the flat-oval bodies to be wrapped. The slots are interrupted by a circumferential groove indicated in the drawing by a dashed circular line and serving for receiving the lifting segment 8 fixedly mounted on the base plate 14. The surface portions of the first slotted wheel 3 which will come into contact with the adhesive tape are provided with an edgeroll for decreasing the adhering surface and thus for diminishing the force required for drawing the tape therefrom. To the shaft of the first slotted wheel 3, a toothed wheel and a coupling arrangement (not shown are fixedly connected for the transmission of the driving torque to the first and the further slotted wheels.

The tape cutting device 7 is substantially identical to that described in the aforementioned copending application and uses a heating wire which is, with the aid of an engaging and disengaging mechanism not shown in the drawing, brought into contact with the adhesive tape to cut same, which runs along with the first slotted wheel over a short distance and which returns then to its start position. For this purpose a toothed wheel is arranged on said shaft of the first slotted wheel provided with a number of engaging grooves equal to the number of slots for receiving bodies to be wrapped.

The second slotted wheel 9 is also pivotably mounted on the base plate 14. A second toothed wheel is arranged on the shaft of slotted wheel 9, which toothed wheel engages the toothed wheel on the shaft of the first slotted wheel. Said second slotted wheel 9 is also provided with a circumferential groove for receiving the lifting segment 10 in addition to the rectangular slots for receiving the bodies to be wrapped. The lifting segment 10 is also fixedly mounted on the base plate 14.

The third slotted wheel 12 is also pivotably mounted on the base plate 14, a toothed wheel also being arranged on the shaft thereof, which toothed wheel engages the toothed wheel of the second slotted wheel. The third slotted wheel and the corresponding lifting segment 13 have substantially the same construction as the second slotted wheel and its lifting segment.

Since the three slotted wheels, the three toothed wheels for the torque transmission, and the toothed wheel for the engaging and disengaging mechanism for the cutting device are arranged on a common base plate, it is obvious that by changing the whole base plate the type of flat-oval body to be wrapped is easily changed. The driving torque is transmitted to the base plate with the aid of the already mentioned coupling.

It is to be understood that the foregoing description of this invention is made by way of example only and is not to be considered as a limitation on its scope.

We claim:

1. Apparatus for wrapping flat-oval bodies with an adhesive tape comprising:
   (a) a base;
   (b) a first wheel rotatably and pivotably mounted to said base and having a plurality of slots formed therein for receiving and retaining the bodies;
   (c) means for bringing the adhesive tape into contact with the bodies retained in said slots of said first slotted wheel;
   (d) means operatively coupled to said first wheel for severing the tape into desired lengths, each length being associated and in contact with an individual one of the bodies;
   (e) a second wheel rotatably and pivotably mounted to said base and having a plurality of slots formed therein for receiving and retaining said bodies from said first slotted wheel;
   (f) first means, operatively arranged relative to said first and second slotted wheels, for transferring the bodies from said first wheel to said second wheel and for causing thereby the partial wrapping of each body with the severed length of tape associated therewith;
   (g) second means operatively arranged relative to said second slotted wheel for transferring the bodies from said second wheel and for causing the final wrapping of the bodies to be effected; and
   (h) third means for receiving the bodies from said second means and for ensuring the completion of the wrapping of each length of tape individually about each body.

2. The apparatus according to claim 1 wherein said second means comprises a guiding segment, having a concave surface arranged proximate to the circumference of said second slotted wheel to form with the surface thereof a curved path, for providing a transfer of each body from said second slotted wheel to said third means and for causing the free end of each severed piece of tape to be removed from said first slotted wheel and the final wrapping to be effected.

3. The apparatus according to claim 2 wherein said first slotted wheel has a circumferential groove therein, and wherein said first means for transferring the bodies comprises a first lifting segment, received in said circumferential groove and fixedly mounted to said first slotted wheel, for positively removing each body from the slots in said first slotted wheel and for directing same to a corresponding slot in said second slotted wheel, and thereby causing each body to be wrapped on all but one side.

4. The apparatus according to claim 2 wherein said third means comprises a third wheel, rotatably and pivotably mounted to said base and having slots formed therein, for receiving the bodies from said second means and for completing the wrapping of the bodies.

5. The apparatus according to claim 4 wherein said second slotted wheel has a circumferential groove therein and wherein said second means further comprises a second lifting segment received in said circumferential groove and fixedly mounted to said second slotted wheel, for positively removing each of the bodies from the slots in said second slotted wheel and directing same to said second means.

6. The apparatus according to claim 4 wherein said third slotted wheel has a circumferential groove therein and wherein said third means further comprises a third lifting segment operatively arranged in the circumferential groove of said third slotted wheel for removing the wrapped bodies from the slots of said third wheel.

References Cited

UNITED STATES PATENTS

| | | | |
|---|---|---|---|
| 2,843,132 | 7/1958 | Pollmann | 53—234 XR |
| 3,156,246 | 11/1964 | Burkhard | 156—450 XR |
| 2,980,565 | 4/1961 | Bardach et al. | 156—567 XR |
| 2,120,505 | 6/1938 | Nifong | 156—456 |

BENJAMIN A. BORCHELT, Primary Examiner

H. J. TUDOR, Assistant Examiner

U.S. Cl. X.R.

156—450, 567